United States Patent [19]

Silversmith et al.

[11] 3,838,438

[45] Sept. 24, 1974

[54] DETECTION, INVERSION, AND REGENERATION IN CHARGE TRANSFER APPARATUS

[75] Inventors: Donald Jack Silversmith, Morristown; Robert Joseph Strain, Plainfield, both of N.J.

[73] Assignee: Bell Telephone Laboratories, Incorporated, Berkeley Heights, N.J.

[22] Filed: Mar. 2, 1973

[21] Appl. No.: 337,669

[52] U.S. Cl............. 357/24, 307/221 C, 307/221 D

[51] Int. Cl.......................... H011 11/00, H011 15/00

[58] Field of Search.. 317/235 G; 307/221 C, 221 D

[56] References Cited

UNITED STATES PATENTS 3,735,156 5/1973 Krambeck et al. ................ 317/235

OTHER PUBLICATIONS

IBM Tech. Discl. Bul. "Regeneration Circuit for Charge – Coupled Device Shift Registers" by Dennard, Vol 4, No 12, 5/72, p. 3791–392.

*Primary Examiner*—Andrew J. James
*Attorney, Agent, or Firm*—G. W. Houseweart

[57] ABSTRACT

Improved means are described for detecting and regenerating information in charge transfer apparatus. In those types of such apparatus having means associated with each electrode for producing thereunder asymmetric potential wells, detection is accomplished by disposing a heavily doped zone under a gap between a pair of successive electrodes and extending that heavily doped zone outside the information channel and passively connecting that extended zone to the gate of an IGFET. In a particular regenerator embodiment, an IGFET diode is included in series with the source-drain circuit of an IGFET to improve control over the launching of the regenerated signal.

11 Claims, 5 Drawing Figures

DETECTION, INVERSION, AND REGENERATION IN CHARGE TRANSFER APPARATUS

BACKGROUND OF THE INVENTION

This invention relates to charge transfer apparatus, and, more particularly, to improved means for detecting and regenerating information stored in such apparatus.

In U.S. Pat. application Ser. No. 114,624 (R. H. Krambeck Case 4–7) of R. H. Krambeck et al. and Ser. No. 114,625 (G. E. Smith Case 20–4) of G. E. Smith et al., both filed Feb. 11, 1971, and both being continuations-in-part of earlier-filed patent applications, there are disclosed a variety of detectors and regenerators for use in charge transfer apparatus. Typically, in such detectors and regenerators, detection is accomplished by disposing electrically floating means in sufficient proximity to a first information channel for detecting charge carriers being stored and transferred at a particular location therein. Regeneration is accomplished by passively coupling the electrically floating means to a field plate electrode which controls the launching of newly injected carriers selectively into a second information channel.

In operation a variety of problems with such detection and regeneration apparatus have become evident. A first problem, as discussed to some extent in the above-mentioned patent application Ser. No. 114,624, is that typically the voltage on the electrically floating means is not as well controlled as is sometimes desired prior to receiving a packet of charge carriers representing information. Another problem, as will be discussed in greater detail hereinbelow, is that in such apparatus the voltage which discriminates between "ones" and "zeros" is not a sufficiently freely chosen variable, but rather has been subject to unduly restrictive compromises, a factor which in some cases can lead to less than optimum performance.

SUMMARY OF THE INVENTION

In view of the aforementioned and other problems inherent in prior art means for detection and regeneration, it is an object of this invention to provide in charge transfer apparatus detection means having improved control over the detection function.

It is a further object of this invention to provide means for detecting information transferring along an information channel without having a substantial perturbing effect on that information.

It is a further object of this invention to provide regeneration means which does not suffer the aforementioned compromise in selection of discrimination voltage.

To these and other ends apparatus in accordance with this invention includes, in charge transfer devices of the type having built-in potential barriers for providing unidirectional transfer of charge, a heavily doped detector zone disposed adjacent one of the potential barriers and essentially only between a pair of successive electrodes along the information channel and extending outside the channel and being passively connected to a control node of an amplifying means, which amplifying means is formed and disposed on the same piece of material as is the information channel itself.

In a preferred regenerator embodiment the aforementioned detection zone is passively connected to the gate electrode of a first IGFET (which provides the amplification function); and an IGFET diode is connected in series with the source-drain circuit of the IGFET to effectively improve control over the launching of the regenerated signal.

BRIEF DESCRIPTION OF THE DRAWING

The aforementioned and other features, characteristics, and advantages, and the invention in general, will be better understood from the following more detailed description taken in conjunction with the accompanying drawing in which.

It will be appreciated that, for simplicity and clarity of explanation, the figures have not necessarily been drawn to scale.

DETAILED DESCRIPTION

Figure 1A:
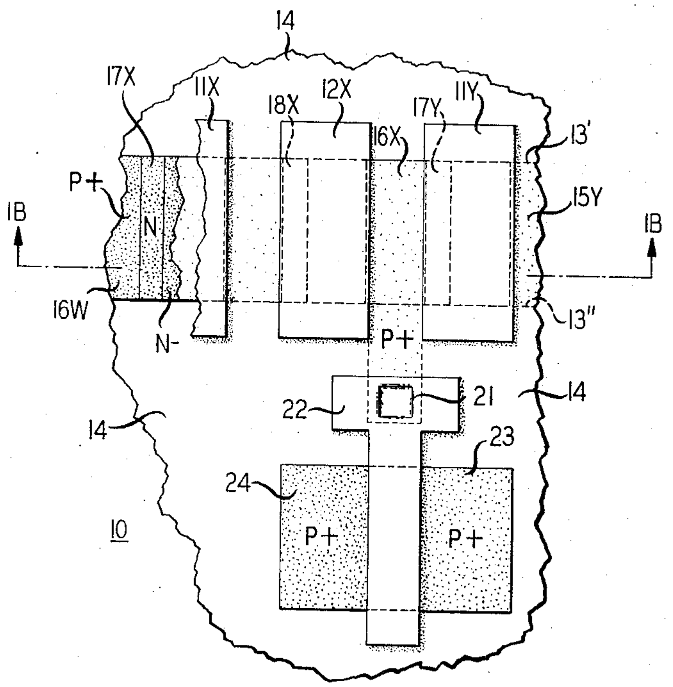
FIG. 1A is a plan view of a portion of a charge transfer device information channel and a detection means in accordance with this invention.
Figure 1B:
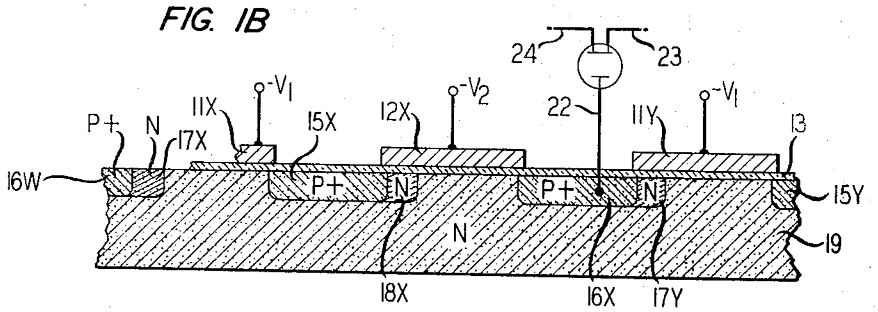
FIG. 1B is a cross-sectional view of a portion of the apparatus in FIG. 1A.

With reference now to FIGS. 1A and 1B, there is shown a plan view and a corresponding cross-sectional view of a portion 10 of a charge transfer device information channel and a detection means in accordance with this invention. As seen, the charge transfer device information channel is defined under a plurality of field plate electrodes 11X, 12X, and 11Y, etc. As is commonly done in the art, the channel is defined under a relatively thin insulating coating 13, between broken lines 13' and 13'' in FIG. 1A, with the remaining portion of the surface of a storage medium covered by a relatively thicker insulating coating designated 14 in FIG. 1A.

The particular type of charge transfer device information channel illustrated in FIGS. 1A and 1B is what has become known in the art as Conductively Connected Charge Coupled Device (C4D), which is described in greater detail in U.S. Pat. application Ser. No. 262,787, filed June 14, 1972, on behalf of R. H. Krambeck, G. E. Smith and R. J. Strain (Case 10–2-8–8). As disclosed therein, and as shown in FIGS. 1A and 1B, C4D-type devices include: an N-type semiconductive storage medium 19 of relatively low dopant concentration; relatively more heavily doped N-type localized zones 17X, 18X, and 17Y disposed under the trailing portion of each field plate electrode; and relatively still more heavily doped $P^+$-type zones 16W, 15X, 16X, and 15Y disposed essentially only under the spaces between successive field plate electrodes.

In operation, a pair of negative voltages $(-V_1)$ and $(-V_2)$ are applied alternately to successive electrodes via a two-phase clock arrangement. Typically, the negative voltages are sufficient to cause substantial depletion of the free electrons in zones 17 and 18, thus exposing the immobile, positively ionized donor impurities located there. These positively ionized impurities have the effect of reducing the magnitude of the negative surface potential under that portion of the electrode under which they lie and thus provide a barrier thereunder sufficient for producing unidirectional transfer of information in response to the two-phase applied clock signals. Because the barriers are disposed principally under the leftmost portions of the electrodes, the direction of transfer of information will be to the right in FIGS. 1A and 1B. For this reason, features disposed to the right of any point in the figures can be termed "downstream;" and features to the left can be termed "upstream."

In operation, the heavily doped $P^+$ zones 15 and 16 act essentially as conductors facilitating the transfer of mobile charge carriers (in this case, holes) from the storage site under the electrode thereadjacent to the left into the storage site under the electrode thereadjacent to the right. As taught in the aforementioned Krambeck-Smith-Strain application, the surface potential of any particular $P^+$ zone, e.g., 16X, will always be the same at the end of a transfer of carriers from the storage site thereadjacent to the left into the storage site thereadjacent to the right. This is because that surface potential at that time is the same as the surface potential of the barrier, e.g., 17Y, thereadjacent to the right, which surface potential is determined almost entirely by the dopant density in the barrier zone and the applied clock voltage, e.g., $(-V_2)$, and is not substantially dependent upon the number of carriers transferred therethrough.

However, just prior to a transfer, when carriers are stored in the potential well to the right of barrier 18X, the potential of $P^+$ zone 16X is at that time not the same as the barrier potential of 17Y, but rather is the same as the potential associated with the stored mobile charge carriers under electrode 12X. For this latter reason, the potential of heavily doped zone 16X is, during a storage interval, uniquely related to the number of carriers stored therein and thereadjacent to the left and so can be used for detecting those carriers.

Apparatus suitable for such detection is shown in FIG. 1A and is illustrated partially schematically in FIG. 1B. As seen in FIG. 1B, the apparatus includes a direct, preferably ohmic, connection to zone 16X and a conductor 22 coupling the potential of that zone to the gate electrode of an IGFET, which has source and drain terminals 23 and 24 interchangeably. The structural manifestation of this connection and the IGFET, illustrated in FIG. 1A, includes, for facilitating connection thereto, the extension of zone 16X outside the information channel as indicated by the broken lines extending downwardly in the figure beyond the channel indicating line 13''. As seen, the zone is contacted via contact window 21 through the insulating layer thereover by metallic overlay contact 22 which, in turn, is extended between a pair of $P^+$ zones 23 and 24. That portion of electrode 22 overlying the space between zones 23 and 24 is intended to operate as the gate electrode of an IGFET, with no special considerations being needed. Accordingly, no further detailed description of that structure is believed necessary.

Of course, the $P^+$ zone, e.g., 16X, need not actually be extended outside the channel, but rather can be contacted by any suitable means disposed between the adjacent electrodes, e.g., 12X and 11Y.

In operation, when the greater of the two negative clock voltages $(-V_2)$ is applied to electrode 12X, $P^+$ zone 16X is driven to its most negative value, a value which is selected to be sufficiently negative to turn on the IGFET associated with zones 23 and 24. Typically, for analog applications, the IGFET will be adapted and biased for operation as a source follower. For digital applications, the IGFET will be adapted and biased for operation as a thresholding element, i.e., such that the IGFET is substantially turned on if an amount of charge carriers representing a particular logic state is present at zone 16X and substantially turned off if an amount of charge carriers representing the other logic state is present at zone 16X.

More specifically then, in a logic application, the IGFET may be adapted and biased such that if a logic "one," represented by a packet of positive mobile charge carriers (holes) is drawn into the storage site under electrode 12X, the potential on zone 16X increases sufficiently that conduction between zones 23 and 24 through the IGFET is significantly reduced, and typically such that the IGFET then is substantially turned off. Conversely, the voltages are selected such that if a logic "zero," represented by a relatively small number of positive mobile charge carriers, is drawn into the storage site under the electrode 12X, there is insufficient change in potential on zone 16X to turn off the IGFET.

Of course, other two-phase structures having built-in barriers, i.e., asymmetries, may be used with the heavily doped zones between electrodes. Such alternative structures include, but, of course, are not limited to, stepped oxide structures of the type described in U.S. Pat. No. 3,651,349, issued Mar. 21, 1972, to D. Kahng and E. H. Nicollian. In such structures, operation of the sensing function will be the same, inasmuch as the potential of the heavily doped zones will be tied to and tracked with the potential of the adjacent barriers and the adjacent storage sites in the manner described with reference to the type of Conductively Connected Charge Coupled Devices disclosed herein.

Having described operation of the basic detection means of FIGS. 1A and 1B, there will now be described with reference to FIGS. 2A and 2B a first regenerator embodiment also in accordance with this invention. To this end, FIG. 2A is an isometric representation of a portion of charge transfer apparatus including a first regenerator embodiment in accordance with this invention; and FIG. 2B is a somewhat enlarged cross-sectional view of the apparatus of FIG. 2A.

Figure 2A:
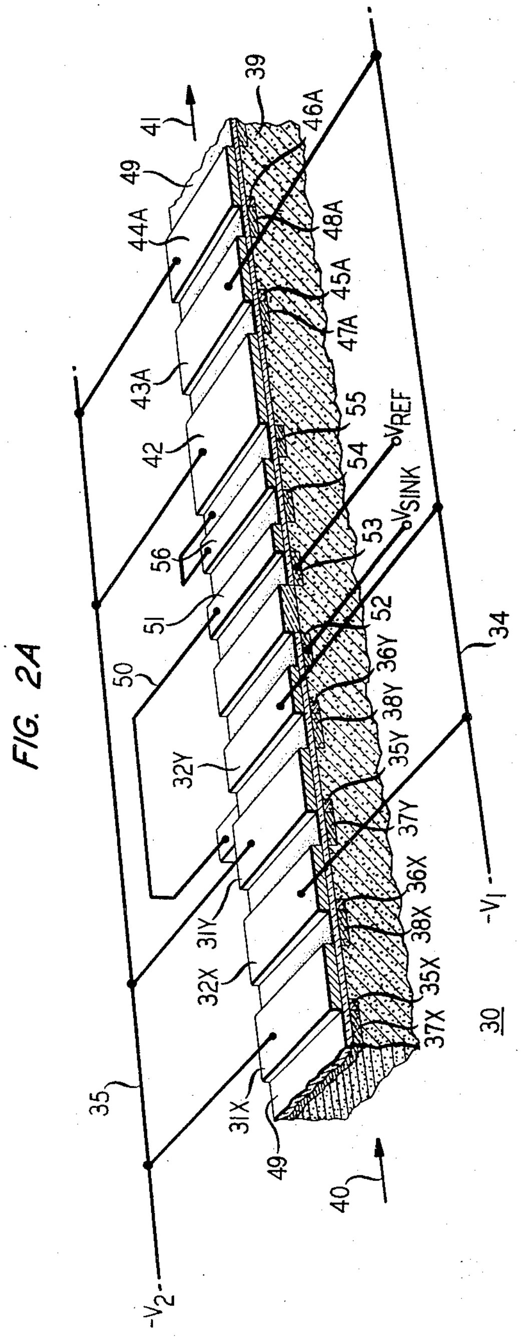
FIG. 2A is an isometric representation of one regenerator embodiment in accordance with this invention.

There is shown in FIG. 2A a portion 30 of charge transfer apparatus, portion 30 including: the end of a first information channel; a regenerator in accordance with an embodiment of this invention; and the beginning of a second information channel. The end of the incoming first channel includes a plurality of spaced, localized field plate electrodes 31X, 32X, 31Y, and 32Y, alternate ones being coupled in common to a pair of conduction paths 34 and 35 to which are applied two-phase clock voltages $(-V_1)$ and $(-V_2)$ as with the embodiment of FIGS. 1A and 1B. The second or outgoing channel similarly includes a plurality of spaced, localized field plate electrodes 43A and 44A. It will be appreciated that arrows 40 and 41 indicate the direction of charge transfer in the apparatus of portion 30.

For convenience of explanation, the Conductively Connected Charge Coupled Device (C4D) having implanted barriers under the trailing edges of the electrodes again is used as the vehicle for illustration. As such, under the electrodes 31X, 32X, 31Y, and 32Y of the incoming channel there are disposed a corresponding plurality of implanted N-type barriers 35X, 36X, 35Y, and 36Y and a similarly corresponding plurality of heavily doped $P^+$-type zones under the spaces between electrodes, those zones being designated 37X, 38X, 37Y, and 38Y. Similarly, in the second or outgoing channel there are associated with electrodes 43A and 44B a plurality of N-type barrier zones 45A and 46A; and, under the spaces between electrodes, are a corresponding plurality of heavily doped $P^+$-type zones 47A and 48A. As further shown, the zones are disposed in a relatively lightly doped N-type storage medium 39 over which a relatively thin insulating channel layer 49 is disposed and over which layer the field plate electrodes are disposed.

Figure 2B:
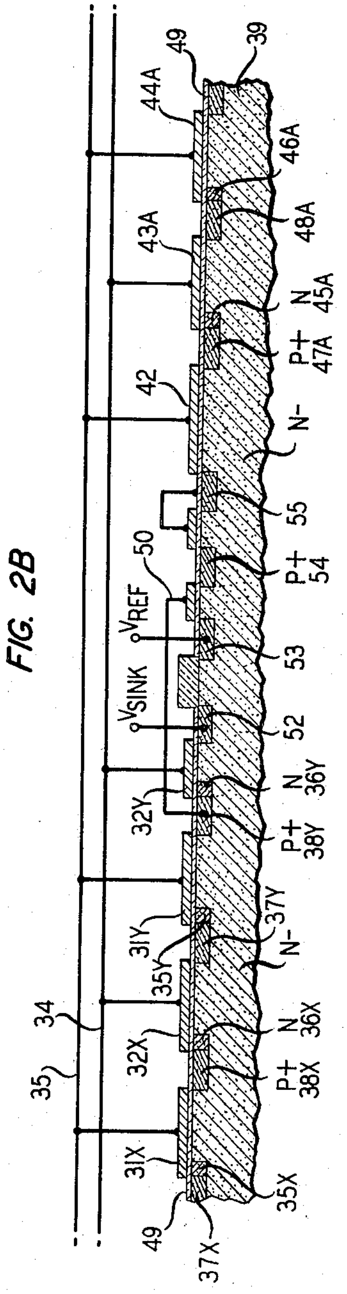
FIG. 2B is a somewhat enlarged cross-sectional view of the apparatus of FIG. 2A.

In accordance with this embodiment of the invention, the regenerator portion of the apparatus of FIGS. 2A and 2B includes previously mentioned heavily doped $P^+$ zone 38Y as a detecting zone, a field plate gating electrode 51, and a conductive connection 50 between zone 38Y and electrode 51. As will be appreciated from the ensuing description, connection 50 need not be purely conductive, but rather, by design choice, may include some impedance. The important characteristic to recognize about connection 50 is that it can be simply a passive element, inasmuch as the regenerator does not require an active amplifying element between sensor zone 38Y and electrode 51 to be operative.

Spaced from detector zone 38Y such that the space is spanned by previously mentioned C4D field plate electrode 32Y is an additional heavily doped $P^+$ zone 52 to which a source of negative potential, designated $V_{SINK}$, is applied for drawing the mobile charge carriers out of the storage medium under electrode 32Y after they have been detected by zone 38Y.

Still a further pair of spaced, heavily doped $P^+$ zones 53 and 54 are shown disposed such that the space therebetween is spanned by previously mentioned gating electrode 51. As shown, zone 53 is coupled to a source of reference potential designated $V_{REF}$. As will be described in greater detail hereinbelow, $V_{REF}$ is that voltage which determines the level of discrimination between "ones" and "zeros" in the regeneration process.

Still further, a part of the regenerator in accordance with this embodiment is an additional field plate electrode 56 disposed on the downstream side of zone 54 and spanning the space between zone 54 and another heavily doped $P^+$ zone 55. As shown in FIGS. 2A and 2B, field plate electrode 56 is connected directly, i.e., conductively, to zone 55. With this connection, the combination of zones 54, 55, and field plate electrode 56 operates as an IGFET diode, the purpose of which is to improve the performance of the regenerator in accordance with this embodiment by ensuring unidirectional transfer and by reducing the dependence of the regenerator on threshold voltages associated with the field plate electrodes, as explained in more detail hereinbelow.

Finally, shown in FIGS. 2A and 2B, there is an oversized field plate electrode 42 disposed so as to span the space between zone 55 and the aforementioned first heavily doped $P^+$ zone 47A of the outgoing channel. Field plate 42 is the first electrode on the downstream side of the regenerator to be connected to a clock voltage. As seen, field plate 42 is connected to the same conduction path, 35, and therefore to the same clock phase as is electrode 31Y, the electrode which causes mobile charge carriers to be drawn into sensor zone 38Y.

In operation, when the most negative of the clock voltages $(-V_2)$ is applied to electrodes 31Y and 42, the $P^+$ sensor zone 38Y is driven to its most negative potential. This most negative potential is designed, in combination with the reference voltage $V_{REF}$ applied to zone 53, such that the IGFET associated with zones 53 and 54 and gate electrode 51 is turned on and remains on if less than a predetermined amount of positive mobile charge carriers representing information are transferred at that time into the storage site under electrode 31Y. Thus, it is seen that the voltage $V_{REF}$ is the primary determinant in establishing the discrimination between "ones" and "zeros" at the storage site under electrode 31Y, and as such must be established with reference to the magnitude of the clock voltages, particularly $(-V_2)$, and is also affected by the threshold voltage associated with electrode 31Y.

The electric force which pulls mobile charge carriers through the IGFET associated with zones 53 and 54 and gate electrode 51 when that IGFET is turned on is determined ultimately by the surface potential under electrode 42, which potential, at this described clock phase, is in turn determined by the applied clock voltage $(-V_2)$. In operation at this described clock phase, the surface potential of zone 55 is the same as the surface potential under electrode 42; and, because electrode 56 is conductively connected to zone 55, the surface potential under electrode 56 is one threshold voltage less negative than the surface potential of zone 55. It is this step in surface potential (caused by the threshold voltage associated with electrode 56) which enables the IGFET diode to ensure unidirectionality of charge transfer, since in normal operation charge carriers cannot flow to the left in FIG. 2A over this step in surface potential.

Finally, the potential at zone 54 is the same as the surface potential under electrode 56; and it is this potential which draws mobile charge carriers from zone 53 through zone 54 and into the storage site under electrode 42 when the IGFET associated with zones 53 and 54 and electrode 51 is turned on.

Assuming that the threshold voltage associated with gate electrode 51 is the same as the threshold voltage associated with field plate electrode 56, an assumption which would usually be valid due to their physical proximity, inclusion of the IGFET diode eliminates the threshold voltage associated with gate electrode 51 from the relationship which establishes the size of charge metering capacitor 42 in relation to other parameters. That latter relationship is as follows:

$$C_{42} = 2C_S \{1 + [(C_{38} + C_{51})/C_S]/1 + 2[(C_{38} + C_{51})/C_S]\}$$

where:

$C_{42}$ is the capacitance associated with the charge metering capacitor 42;

$C_{38}$ is the capacitance between detector zone 38Y and substrate 39;

$C_{51}$ is the capacitance between gate electrode 51 and substrate 39; and $C_S$ is the storage capacitance associated with the storage site under electrode 31Y.

In the equation above, both factors of "2" occur because of an assumed placing of the discrimination level half (½) way between a perfect "zero" and a perfect "one." If it is desired to set the discrimination closer to the "one" level, the factor becomes correspondingly smaller; and for discrimination closer to "zero" the factor becomes larger. For example, if discriminating at one-third (⅓) above a "zero," the factor is "3."

For many applications the regeneration apparatus described with reference to FIGS. 2A–2B is entirely suitable. However, for other applications, the launching portion of that regenerator can itself introduce signal degradation, due principally to the fact that charge metering capacitor 42 in FIGS. 2A–2B is not simply a capacitor but is actually the gate electrode of an IGFET, of which zone 55 operates as a source and zone 47A operates as a drain. It has been found that in embodiments where the capacitance associated with zone 55 is an appreciable fraction of the capacitance associated with the storage site under electrode 42, a significant fraction of the mobile charge carriers representing a "one" can be trapped in zone 55 during the clock phase when those carriers should be transferring into the storage site under electrode 43A. This trapped charge is a problem because it will be added to one or more subsequent "zeros."

Figure 3:
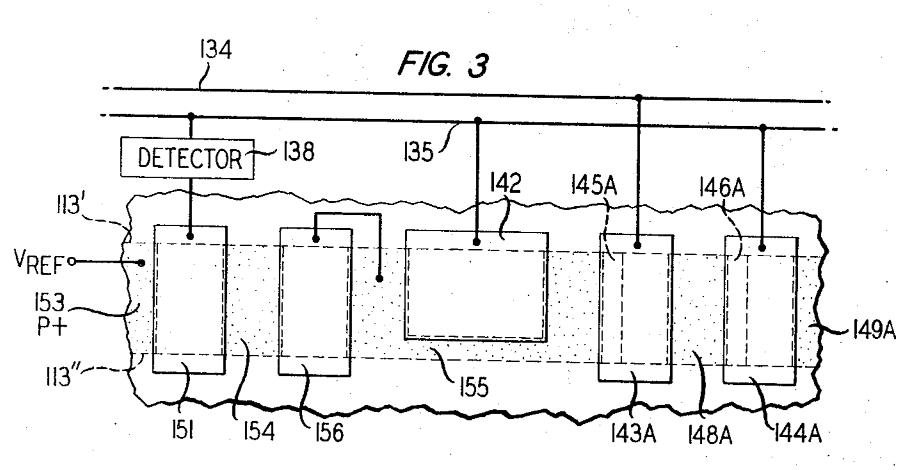
FIG. 3 is a plan view of the launching portion of a preferred regenerator in accordance with this invention.

This last-described contribution to signal degradation is avoided in a preferred regenerator embodiment, the output or launching portion of which is shown in plan view in FIG. 3. Where considered appropriate, reference numerals used in FIG. 3 to refer to features analogous to ones in FIGS. 2A and 2B are the same as those in FIGS. 2A and 2B, except that 100 has been added to each, e.g., gate electrode 51 in FIG. 2A is feature 151 in FIG. 3.

In FIG. 3 the charge transfer information channel is located between broken lines 113' and 113''. Electrodes 143A and 144A are the first two electrodes in the outgoing channel, and as such overlie N-type barrier zones 145A and 146A. Heavily doped $P^+$-type zones 148A and 149A, analogous to zones 48A and 49A, are disposed between the electrodes. An electrode 151 is disposed between $P^+$-type zones 153 and 154, and is connected to a detector 138 (which can be simply a $P^+$ zone, such as zone 38 in FIG. 2A). An electrode 156 is shown disposed between $P^+$ zones 154 and 155 and is connected to zone 155 to form the IGFET diode. An electrode 142 provides the charge metering capacitance and as such is connected to the same one, 135, of a pair of clock lines 134 and 135 as is detector 138.

It should be understood that the important thing about these differences is the connection of zones 55 and 47A by essentially conductive means (the $P^+$ strip therebetween in FIG. 3). Electrode 151 could as well extend completely across the channel and zone 155 could as well extend completely under electrode 151. The reason for the particular geometry illustrated in FIG. 3 is that the expected fabrication technique would use the electrodes, typically silicon or a refractory metal, as masks to enable selective introduction, e.g., by diffusion or ion implantation, of the $P^+$ zones, including zone 155, in what is termed in the art a self-aligned fashion.

Although the invention has been described in part by making detailed reference to certain specific embodiments, such detail is intended to be, and will be understood to be, instructive rather than restrictive. It will be appreciated by those in the art that many variations may be made in the structure and modes of operation without departing from the spirit and scope of the invention as disclosed in the teachings contained herein.

For example, throughout the disclosure the semiconductivity types may be reversed as desired, provided a corresponding reversal of voltage polarities also is made.

Also of course the regenerators need not be formed in a straight line as illustrated in FIGS. 2A and 2B but rather can have the launching function, e.g., from zone 53 downstream in FIG. 2A, separated from the detection portion as described in the aforementioned Krambeck et al. and Smith et al. applications.

Still further in accordance with the teachings in the aforementioned Krambeck-Strain and Smith-Tompsett applications, the apparatus is not limited to sensing only a single incoming channel or to launching only a single outgoing channel, but may include sensing of a plurality of incoming channels or launching a plurality of outgoing channels through the use of a plurality of sensors and/or gating electrodes. And, of course, the logic functions described in the aforementioned Smith-Tompsett application may as well be used with that regenerator disclosed herein as with the regenerators disclosed therein.

What is claimed is:

1. In charge coupled apparatus of the type including a semiconductive storage medium and means forming an information channel and including a plurality of electrodes and barrier means associated with each electrode for imparting asymmetry to the potential well formed under each electrode upon application of a voltage thereto, means for detecting and regenerating information stored therein comprising:

a first insulated gate field-effect transistor (IGFET) having source and drain zones and a gate electrode;

a heavily doped detector zone disposed under the space between a pair of adjacent electrodes;

means coupling the voltage of the heavily doped zone to the gate electrode of the first IGFET;

an IGFET diode having a gate electrode and a drain zone connected in common and having a source zone electrically common with the drain of the first IGFET; and first field plate electrode means and barrier means disposed on the downstream side of the heavily doped zone for resetting the voltage of the heavily doped zone in response to a voltage applied to the field plate electrode prior to a detecting operation.

2. Apparatus as recited in claim 1 wherein the means coupling the voltage of the heavily doped zone to the gate electrode is entirely passive.

3. Apparatus as recited in claim 2 wherein the coupling means includes a substantially ohmic conduction path having two ends, one of which is connected to the heavily doped zone and the other of which is connected to the gate electrode of the first IGFET.

4. Apparatus as recited in claim 1 wherein the means coupling the voltage of the heavily doped zone to the gate electrode includes an extension of the heavily doped zone laterally outside the information channel.

5. Apparatus as recited in claim 1 including:

a second field plate electrode on the downstream side of and adjacent to the IGFET diode, said second field plate electrode being larger in area than the other electrodes; and an additional heavily doped zone disposed adjacent to and on the downstream side of the second field plate electrode.

6. Apparatus as recited in claim 5 wherein no barrier means are associated with the second field plate electrode.

7. Apparatus as recited in claim 5 wherein the additional heavily doped zone is connected by substantially conductive means to the drain and gate of the IGFET diode.

8. Apparatus as recited in claim 5 wherein the additional heavily doped zone is connected so as to be electrically common with the drain of the IGFET diode.

9. Apparatus as recited in claim 8 including a heavily doped strip of the same type semiconductivity as the drain zone of the IGFET and the additional heavily doped zone, the strip being disposed longitudinally along an edge of the information channel between and intersecting the drain zone of the IGFET and the additional heavily doped zone.

10. Apparatus as recited in claim 9 wherein the second field plate electrode is disposed essentially only over that part of the information channel between the drain of the IGFET diode and the additional heavily doped zone other than that occupied by the heavily doped strip.

11. Apparatus as recited in claim 1 including a plurality of the heavily doped zones, a separate one of which is disposed under each space between adjacent ones of the plurality of electrodes.

* * * * *

UNITED STATES PATENT OFFICE
CERTIFICATE OF CORRECTION

Patent No. 3,838,438 Dated September 24, 1974

Inventor(s) Donald J. Silversmith and Robert J. Strain

It is certified that error appears in the above-identified patent and that said Letters Patent are hereby corrected as shown below:

Cover page under Assignee: delete "Berkeley Heights" and insert --Murray Hill--.

Signed and sealed this 11th day of February 1975.

(SEAL)
Attest:

RUTH C. MASON
Attesting Officer

C. MARSHALL DANN
Commissioner of Patents and Trademarks